(12) United States Patent
Capecelatro et al.

(10) Patent No.: US 12,249,327 B1
(45) Date of Patent: Mar. 11, 2025

(54) CONTEXTUAL PREMISES AUTOMATION BUTTON

(71) Applicant: Josh.ai, Inc., Denver, CO (US)

(72) Inventors: Alex Nathan Capecelatro, Los Angeles, CA (US); Timothy Earl Gill, Denver, CO (US); Scott Lon Allen, Denver, CO (US); Brian Hulme, Morrison, CO (US); Derek Murphy, Highlands Ranch, CO (US); Edward John McKenna, Jr., Denver, CO (US); Kevin Carper, Denver, CO (US)

(73) Assignee: Josh.ai, Inc., Denver, CO (US)

(*) Notice: Subject to any disclaimer, the term of this patent is extended or adjusted under 35 U.S.C. 154(b) by 308 days.

(21) Appl. No.: 17/519,940

(22) Filed: Nov. 5, 2021

Related U.S. Application Data

(60) Provisional application No. 63/110,879, filed on Nov. 6, 2020.

(51) Int. Cl.
| | |
|---|---|
| *G10L 15/22* | (2006.01) |
| *G06F 3/02* | (2006.01) |
| *G06F 3/044* | (2006.01) |
| *G06F 3/14* | (2006.01) |
| *H05B 45/10* | (2020.01) |
| *H05B 47/12* | (2020.01) |

(52) U.S. Cl.
CPC ............. *G10L 15/22* (2013.01); *G06F 3/02* (2013.01); *G06F 3/044* (2013.01); *G06F 3/14* (2013.01); *H05B 45/10* (2020.01); *H05B 47/12* (2020.01); *G10L 2015/223* (2013.01); *G10L 2015/228* (2013.01)

(58) Field of Classification Search
CPC ......... G10L 15/22; G10L 15/00; G10L 15/06; G10L 15/064; G10L 15/065; G10L 15/07; G10L 15/18; G10L 15/1815; G10L 15/1822; G10L 15/183; G10L 15/20; G10L 15/24; G10L 15/26; G10L 2015/0631–0638; G10L 2015/221–228
See application file for complete search history.

(56) References Cited

U.S. PATENT DOCUMENTS

| | | | | |
|---|---|---|---|---|
| 10,616,726 | B1 * | 4/2020 | Freeman | H04W 8/02 |
| 10,914,811 | B1 * | 2/2021 | Wild | H04M 11/025 |
| 2017/0332035 | A1 * | 11/2017 | Shah | G10L 15/30 |

\* cited by examiner

*Primary Examiner* — Qi Han
(74) *Attorney, Agent, or Firm* — Van Pelt, Yi & James LLP

(57) ABSTRACT

A device, comprises a microphone and a communication interface configured to send to a premises automation control core audio input received via the microphone. The premises automation control core is configured to determine, based at least in part on the audio input, a premises automation context associated with the device and send to the device via the communication interface a context data indicating the determined context. The devices also comprises a visual display device, a physical input device, and a processor coupled to the visual display device and the communication interface. The processor is configured to receive the context data and cause the visual display device to provide a visual display associated with the context data. At least one of the processor and the premises automation control core is configured to respond in a manner determined at least in part based on the context data to an alternate input made via the physical input device while the visual display device is providing the visual display associated with the context data.

24 Claims, 9 Drawing Sheets

CONTEXTUAL PREMISES AUTOMATION BUTTON

CROSS REFERENCE TO OTHER APPLICATIONS

This application claims priority to U.S. Provisional Patent Application No. 63/110,879 entitled CONTEXTUAL HOME AUTOMATION BUTTON filed Nov. 6, 2020 which is incorporated herein by reference for all purposes.

BACKGROUND OF THE INVENTION

One use for technology is to establish a system of control. In premises automation, for example home automation, a system controls various aspects of the premises such as lighting, music, and heating, ventilation and air conditioning (HVAC) based in part on user input. To control each aspect of the premises automation system may be overwhelming or time consuming. It would be useful to have easier ways to maintain a system of control.

BRIEF DESCRIPTION OF THE DRAWINGS

Various embodiments of the invention are disclosed in the following detailed description and the accompanying drawings.

DETAILED DESCRIPTION

Figure 1:
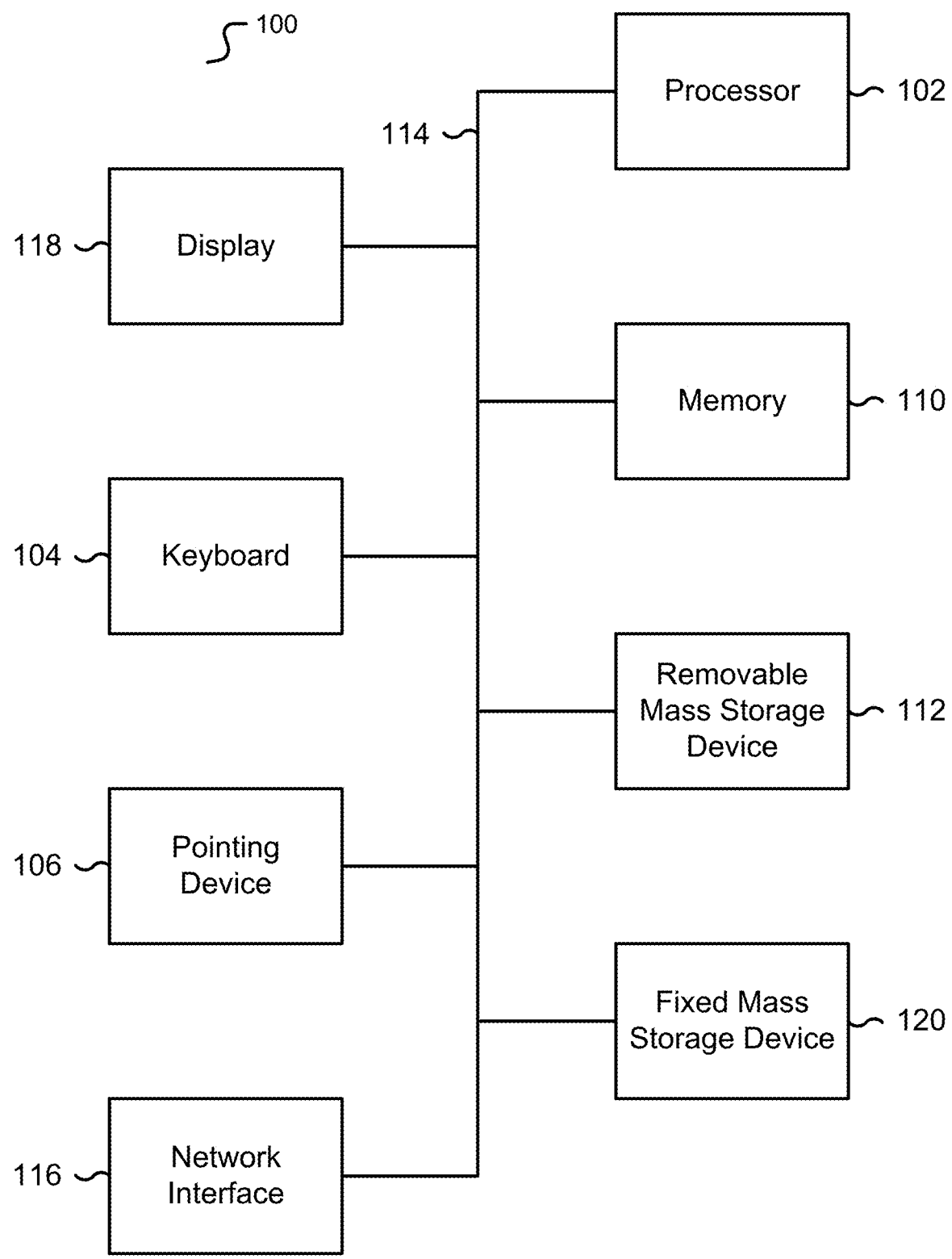
FIG. 1 is a functional diagram illustrating a programmed computer/server system for control of complex input in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A contextual premises automation button is disclosed. In one embodiment, the system includes an audio system. An audio system may include distributed microphones and/or an efficient integration with existing distributed premises sound systems, including smart sound systems. Audio systems may be important for premises automation for simple and intuitive control, for example having a user state out loud "please turn off the master bedroom lights at 8 pm tonight" and/or a system responding "got it, lights in the master bedroom will be turned off in a couple hours." Premises automation also includes controlling audio systems such as music and/or television audio channels.

Without limitation, a 'button' as referred to herein is any control that may be set between at most two states. Examples of a button include a capacitive touch area that senses when a human touches a region and when the human withdraws their touch, a push-button, a biased switch, a rocker switch, a toggle switch, a binary switch, and any physical switch.

A button has an advantage of a simple user interface that any user may learn. A natural disadvantage is that the one or two states of a button may not cover all controllable aspects of premises automation such as per-room lighting, music, blinds, HVAC, and so forth. Adding context to a button to provide greater premises automation control functionality while maintaining the simple user interface is disclosed. Without limitation, 'context' as referred to herein is any additional metadata and/or state that adds further meaning to the button. For example, a 'music volume' context may turn a button previously used to toggle bedroom lights to a button used to toggle music volume.

FIG. 1 is a functional diagram illustrating a programmed computer/server system for control of complex input in accordance with some embodiments. As shown, FIG. 1 provides a functional diagram of a general purpose computer system programmed to provide premises automation in accordance with some embodiments. As will be apparent, other computer system architectures and configurations can be used for premises automation.

Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display and graphics processing unit (GPU) 118.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data, and objects used by the processor 102 to perform its functions, for example, programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read-only) to processor 102. For example, storage 112 can also include computer-readable media such as flash memory, portable mass storage devices, holographic storage devices, magnetic devices, magneto-optical devices, optical devices, and other storage devices. A fixed mass storage 120 can also, for example, provide additional data storage capacity. One example of mass storage 120 is an eMMC or microSD device. In one embodiment, mass storage 120 is a solid-state drive connected by a bus 114. Mass storages 112, 120 generally store additional programming instructions, data, and the like that typically are not in active use by the processor 102. It will be appreciated that the information retained within mass storages 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a communication interface 116, a touch (or physical) keyboard 104, and one or more auxiliary input/output devices 106 including an audio interface, a sound card, microphone, audio port, audio input device, audio card, speakers, a touch (or pointing) device, and/or other subsystems as needed. Besides a touch screen, the auxiliary device 106 can be a mouse, stylus, track ball, or tablet, and is useful for interacting with a graphical user interface.

The communication interface 116 allows processor 102 to be coupled to another computer, computer network, or telecommunications network using a network connection as shown. For example, through the communication interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification, "network" refers to any interconnection between computer components including the Internet, Bluetooth, WiFi, 3G, 4G, 4GLTE, GSM, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous and/or heterogeneous systems and/or groups of systems together. Additional mass storage devices, not shown, can also be connected to processor 102 through communication interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2A:
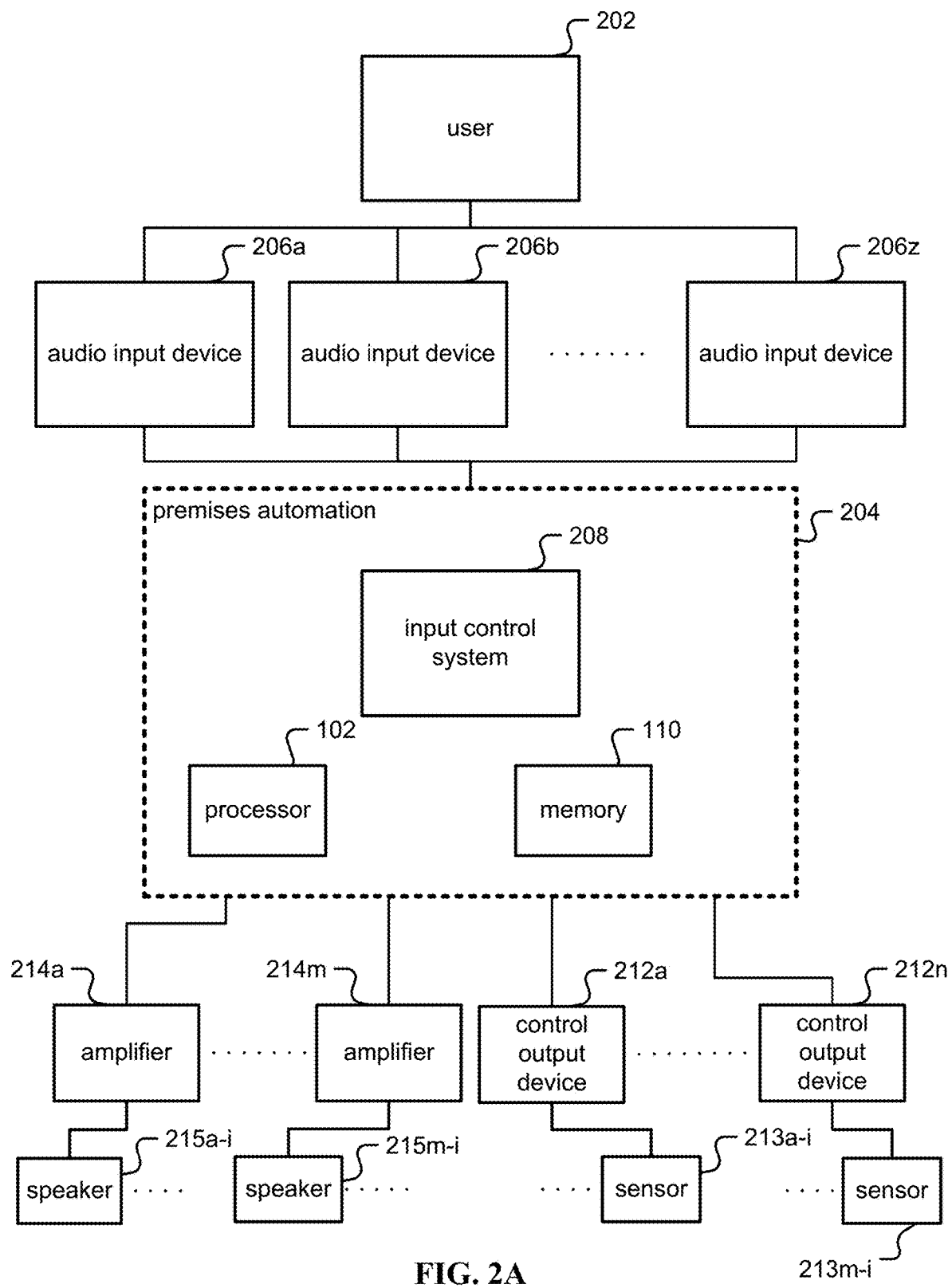
FIG. 2A is a block diagram illustrating an embodiment of a system for premises automation.

FIG. 2A is a block diagram illustrating an embodiment of a system for premises automation. User (202) is coupled to premises automation system (204), either through distributed sensor input devices (206), for example, audio input devices, here shown with three devices (206a), (206b), and (206z), if by way of speech, or directly to the input control system (208) if by way of written word, for example, by typing or texting on an associated app.

In one embodiment, premises automation system (204) is a computer system as shown in FIG. 1 and includes processor (102) and memory (110). In one embodiment, the premises automation system (204) is a mobile phone, computer, or dedicated smart home device. Without limitation, throughout this specification the dedicated smart home device referenced herein as a "core" device is illustrated as the premises automation system (204). In one embodiment, a physical phone, touchscreen, swipe-based keyboard, and/or virtual keyboard (104) is included for typing or texting. The audio input device(s) (206) may be coupled and/or part of the input control system (208) as well.

After interpreting programming, the input control system (208) may be coupled to one or more control output devices (212), here shown with more than two devices (212a), . . . , (212n). The control output devices (212) may be a single smart home hub (212a) and/or may include additional smart home devices for direct control. One or more other sensors (213) may be part of any control output device (212).

To cue feedback from premises automation core (204) to the user giving speech commands to one or more of the audio input devices (206), an existing distributed network of speakers (215), which may be external speakers being external to the audio input devices (206), may be used by interfacing with an existing set of associated amplifiers (214). Premises automation core (204) may also playback music and/or television/media audio through the existing set of speakers and/or smart speakers (215).

Figure 2B:
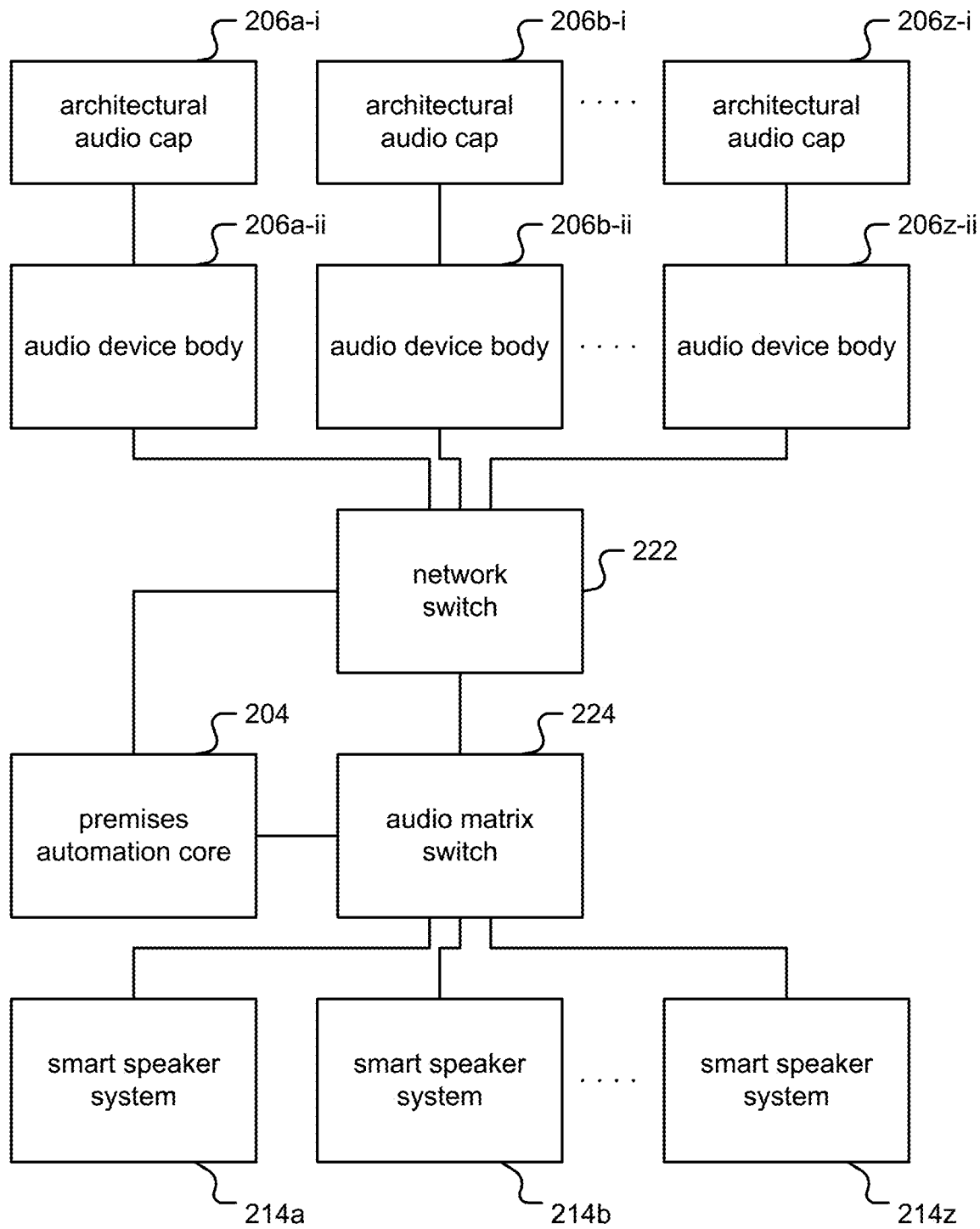
FIG. 2B is a block diagram illustrating an embodiment of an audio system for premises automation recommendations.

FIG. 2B is a block diagram illustrating an embodiment of an audio system for premises automation recommendations. In one embodiment, the audio system in FIG. 2B is at least part of the system in FIG. 2A to provide feedback to speech commands and/or provide music or media audio as a result of said speech commands.

An improvement for a premises automation system is having a large number of distributed audio input devices (206) so as to permit a user to communicate with the premises automation system from any region of the premises. In order to minimize construction costs and in order to maximize aesthetic compatibility with most rooms of a residential/commercial/industrial premises, the audio input devices (206) are "modular" and/or small. Without limitation, the input devices (206) may be video input devices, audio/video input devices, and/or devices with a different sensor other than an audio or video sensor; the example of audio is given herein by way of example.

In one embodiment, a given audio input device (206a) is made up of an architectural sensor, wherein "architectural" is defined herein as a device with a low-profile that may be compatible with a broad aesthetic and suitable for nearly any room, for example, a device less than 40 mm in length, less then 40 mm in width, and less than 4 mm thick from a finished surface, such as a finished wall surface. One example of an architectural sensor is one or more microphones, for example, a far-field microphone and/or microphone array. Other examples of an architectural sensor include: a camera, a motion sensor, a heat sensor, and another sensor to detect sensory or other input associated with a human present in the physical space around the device (206a).

In one embodiment, the input device (206a) includes a privacy switch that is itself architectural and low profile, for example, less than 0.5 mm thick. When the privacy switch is engaged, the humans present in a physical space in which the input device (206a) and an associated sensor are deployed are given an assurance of stronger privacy, for example, because the physical circuit path that electrically couples an output signal generated by the sensor to a premises automation system processing component is interrupted. In one embodiment, when the physical circuit path is interrupted, a human-observable indicator is given, for example, a painted switch position in the "privacy on" position, a visual cue such as one or more LEDs, and/or an audio cue such as one or more tones.

In one embodiment, the audio input device (206a) is modular, being made up of a low-profile architectural audio cap portion (206a-i) that is low-profile and in a given room, and an audio device body portion (206a-ii) which is recessed within a wall/ceiling/floor and interfaces with the cap (206a-i) inside said wall/ceiling/floor. The audio input device (206a) is modular in the sense that caps (206a-i) with other sensors, styles, and/or functionality may be interchanged by a user once a construction team has embedded the audio device body portion (206a-ii) in a wall/ceiling/floor.

In one embodiment, the audio device bodies (206a-ii), (206b-ii), . . . (206z-ii) are connected through a network connection, for example, an Ethernet connection such as a PoE (Power over Ethernet) coupling, to a network switch (222) or collection of network switches (222). The network switch (222) is also coupled to a premises automation core (204), also shown in FIG. 2A, and an audio matrix switch (224). An audio matrix switch (224) allows configuration of one or more audio inputs to be connected to one or more audio outputs. The audio outputs from the audio matrix switch include one or more smart speaker/amplifier systems (216), here shown to include at least three (216a), (216b), and (216z), also referred to as the amplifier (214) and speaker (215) combination in FIG. 2A.

Figure 3A:
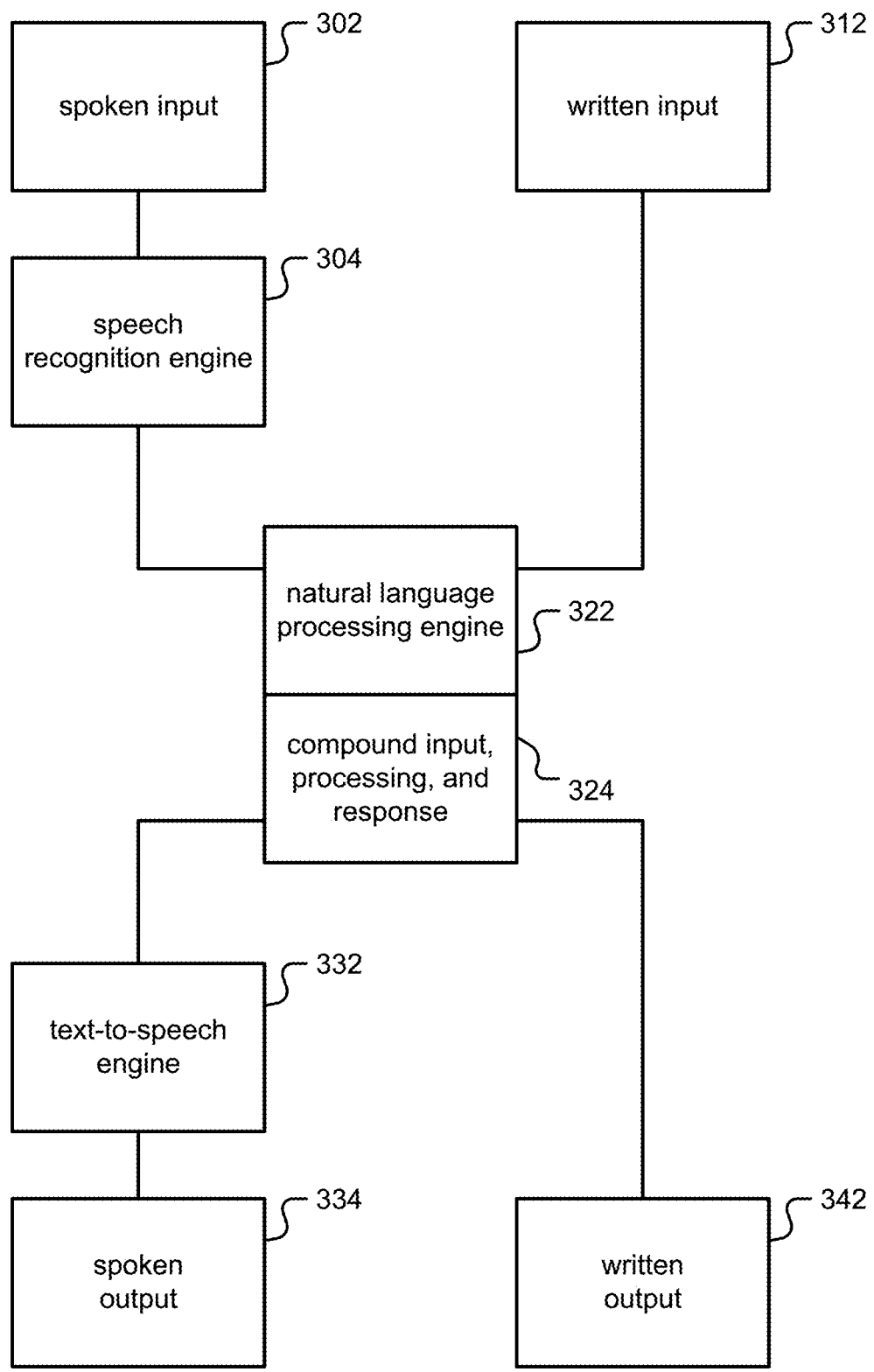
FIG. 3A is a block diagram illustrating an embodiment of a system for complex input speech and written processing.

FIG. 3A is a block diagram illustrating an embodiment of a system for complex input speech and written processing. In one embodiment, the system of FIG. 3A is at least part of the premises automation system (204) and/or control output device (212a) in FIG. 2A.

As FIG. 3A illustrates, input may be spoken and/or written and is referred to herein as an "utterance", and output may be spoken and/or written. Spoken input (302) is processed by a speech recognition engine (304) before being passed to the natural language processing engine (322). Written input (312) may be processed directly by the natural language processing engine (322). In one embodiment, written input (312) may correct, add, edit, and/or delete the resultant input from spoken input (302) and speech recognition engine (304).

Note that in some cases, the spoken input (302) and/or written input (312) may have little or no punctuation, capitalization, and/or proper nouns recognized. Natural language processing engine (322) applies rules and couples the system for complex/compound input, processing, and response (324), referred to herein as "intent". User notification of responses includes written output (342) from system (324), and may include a text-to-speech engine (332) to provide spoken output (334) as well.

Figure 3B:
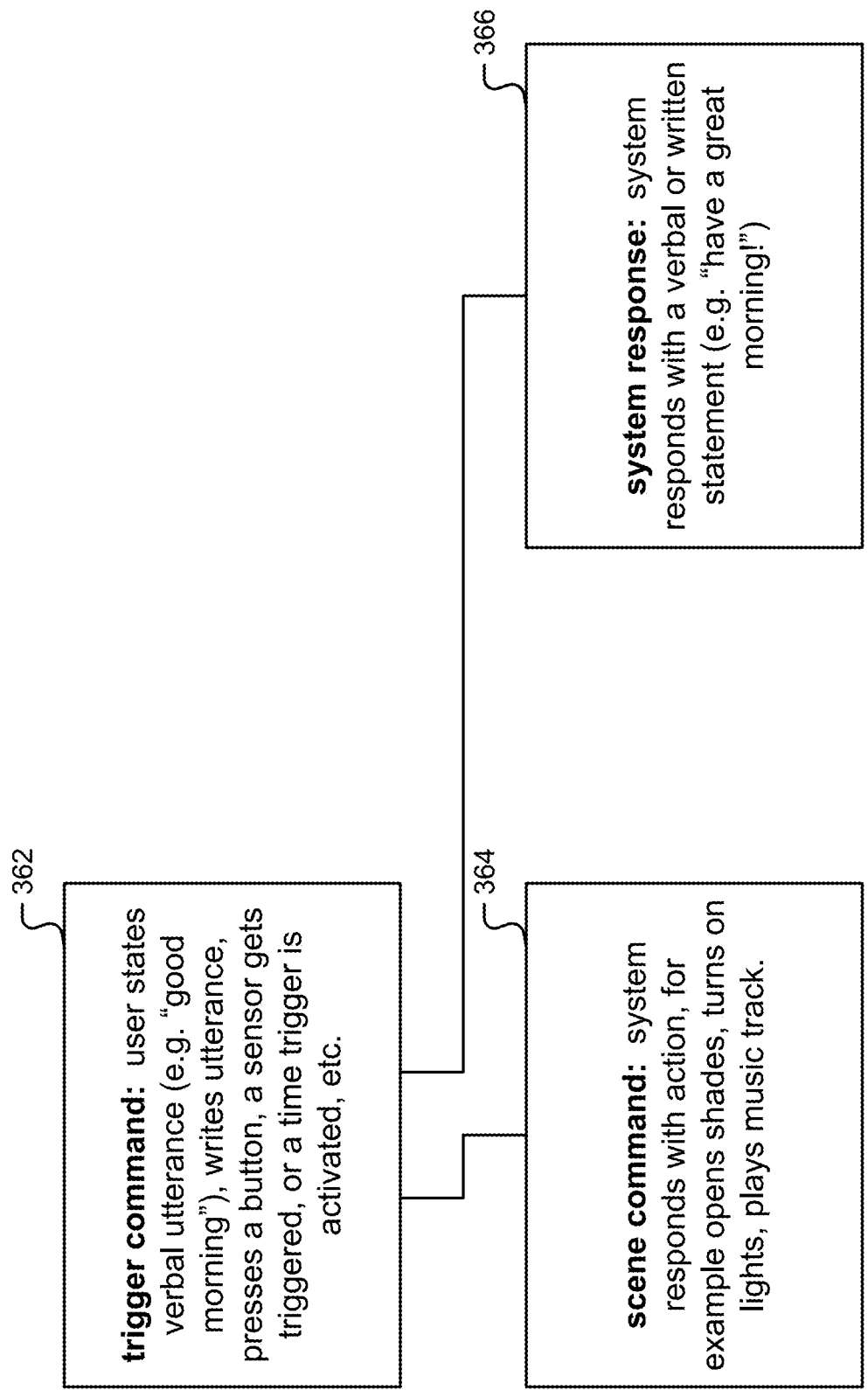
FIG. 3B is an illustration of a trigger and corresponding scene command.

FIG. 3B is an illustration of a trigger and corresponding scene command. In one embodiment, the illustration of FIG. 3B is carried out by the system (204) of FIG. 2A.

Trigger command (362) is an action that triggers a scene. In the example of FIG. 3B, the action includes: a voice command, for example, a user that says "Good morning"; a button press, for example, a user that presses a button titled "Morning"; a triggered sensor; and/or a triggered time, for example, based on a schedule. In each case the trigger indicates a "begin good morning scene" intent.

After the system is triggered (362), the system may optionally respond with a "scene" command (364).

Examples given in FIG. 3B include opening the shades, turning on the lights, and playing a musical track. A scene command, also referred to herein as a "premises automation scene," is a convenient way to refer to one or more aspects of premises automation. For example, a "good morning" command may include opening the shades, turning on the lights, and playing a musical track suitable for mornings because the user prefers to start their morning with these aspects of premises automation. After the system is triggered (362), a system response (366) may optionally be issued by responding with a written or verbal output, for example, "Have a great morning!"

Figure 4A:
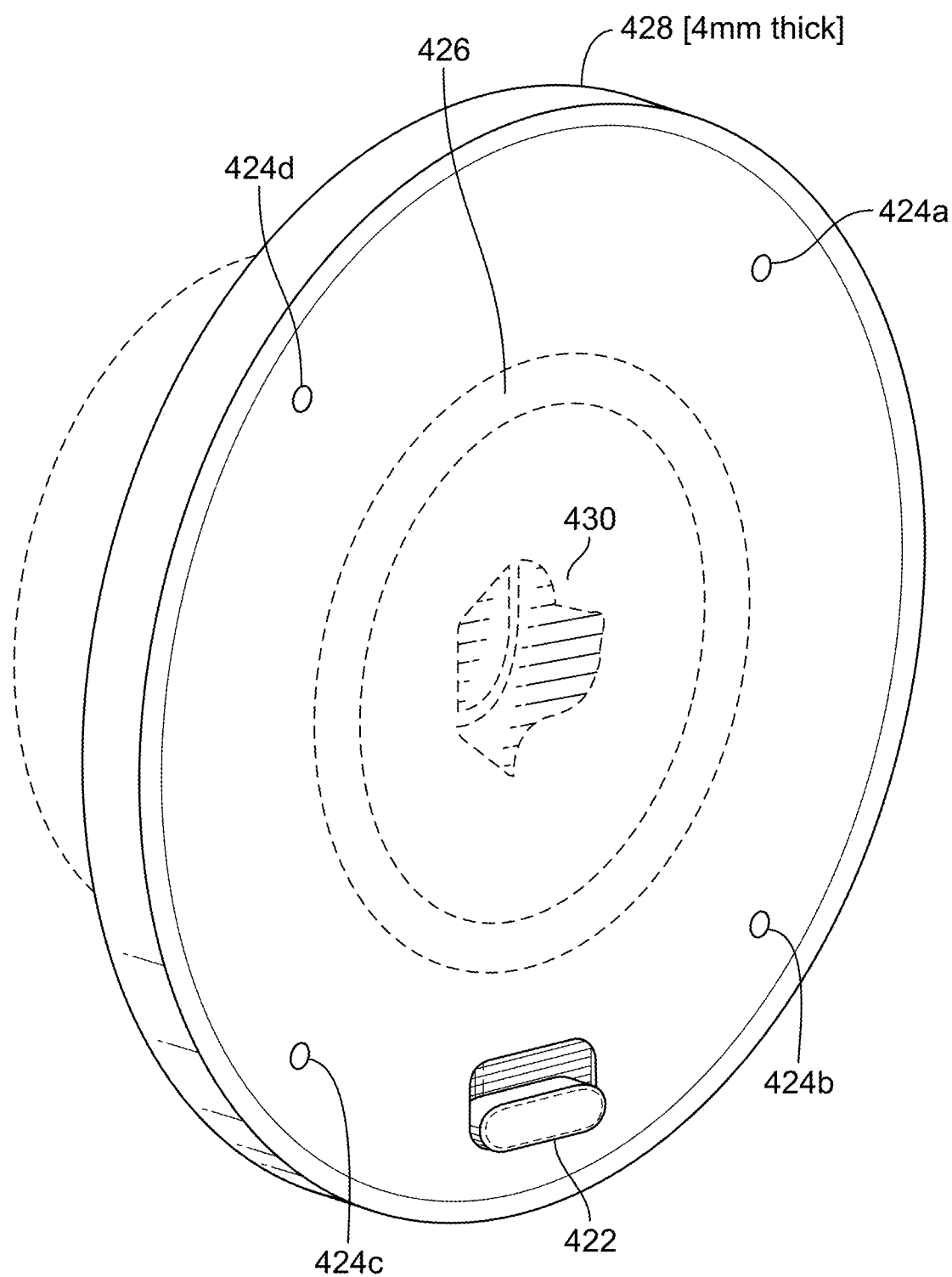
FIG. 4A is an illustration of an embodiment for an architectural audio/microphone cap.

FIG. 4A is an illustration of an embodiment for an architectural audio/microphone cap. In one embodiment, the illustration of FIG. 4A is depicted as component (206a-i), (206b-i), . . . (206z-i) in FIG. 2B.

The cap of FIG. 4A has one or more privacy switches (422). In one embodiment, the physical privacy switch (422) is a switch that assures users of privacy by disrupting a physical and/or electrical connection associated with the input sensor of the cap, for example, it electrically and/or physically disconnects all the microphones and/or cameras. The physical privacy switch (422) may be in the front face of the cap.

The cap also comprises at least one sensor such as a microphone referred to herein as "(424)", here shown in FIG. 4A as a far-field microphone and/or microphone array of four microphones (424a), (424b), (424c), (424d). The cap may contain one or more cameras and/or light-sensing/heat-sensing sensors (not shown in FIG. 4A). In one embodiment, the cap includes an indicator for feedback, for example, a display, a visual indicator, an LED, or a multicolored LED ring (426). As described above, to improve usability of the cap in any room and improve aesthetics, the cap is designed to be low-profile, here shown to have a thickness of 4 mm (428) from its finished surface such as a finished wall surface.

The cap shown in FIG. 4A may be a modular system with an edge connector between the cap (206a-i) and body (206a-ii) that allows upgrades and/or different functionality for a given body using one or more caps. In one embodiment, the "edge connector" is a 30-pin analog/digital input/output connector to allow future flexibility in terms of the audio input devices such as a cap (206a-i) used. For example, a different architectural style and/or a different audio microphone array configuration may be used in a future cap (206a-i).

Premises Context and Session Context. As shown in FIG. 4A, a first user may be in a room, say a kitchen, with audio cap (206b-i) and smart speaker system (214z), while a second user may be in a room, say a garage, with audio cap (206c-i) and smart speaker system (214a). The premises automation core (204) with two sets of stereo outputs is configured to simultaneously maintain a first session with the first user, a second session with the second user. Without limitation, a premises automation core (204) may have more than two sets of stereo outputs to support more simultaneous users, for example three outputs for three simultaneous users. The core (204) may do this by:

receiving and/or interpreting received audio in a premises context associated with the session with which it is associated, for example remembering that the first user is in the kitchen and may be referring to kitchen room functions. As referred to herein, a "premises context" is a set of context related to the physical space/room where input and/or output is received and may be associated with a specific human/user;

generating and/or sending responses to output in a premises context associated with the session with which it is associated, for example remembering that the second user is in the garage, routing the audio matrix switch (224) to the garage, and controlling devices in the garage; and/or maintaining premises context as a function of the session, the physical space/room, and/or the associated user, for example with voice recognition mapped to context for the first user, such as a voice recognition profile. As referred to herein, a "session context" is a set of context analogous to following a conversation between a human/user and the premises automation personality, including the premises context, associated human, and where in a time sequence the conversation is at currently.

The cap of FIG. 4A may have a contextual premises automation button (430) and/or have a single capacitive touch sensor (430) that acts as a button. Before any command is given, a default may be assigned to the button, such as toggling the state of lights in a room, asserting a scene, and/or waking up the microphone similar to a wake word. When a command is given, such as an audio input like an utterance "turn on the lights" the device may display LEDs (426) in a color to indicate lights on, in this case yellow. Tapping the button (430) then toggles the lights to off and changes the display LEDs (426) to be a faint yellow. If the command were to "open the shades", the LEDs (426) may instead indicate blue for shades, and when the button (430) is tapped, the shades may close and the LEDs (426) turn faint blue.

The audio input comprises at least one of the following: a voice command such as "Josh, turn on the lights" while uttered nearest to the dining room device such that the premises automation context is determined to be 'dining room lighting'; a voice command such as "Josh, what is the lighting level in the dining room?" that the premises automation core determines the premises automation context as 'dining room lighting'; an explicit voice command that names the premises automation context such as "Josh, please control the dining room lights"; and a sound in a room associated with the device such as a stumbling noise in a dark room that may determine the premises automation context to be 'security' wherein a tap will set off the alarm in the event of a prowler. Other examples of a sound trigger for context may include a tea kettle whistle indicating a context of 'kitchen range' to turn off the kettle's heat, and a sound of running water indicating a context of 'intercom' wherein a tap will set off an phone link with a plumber. In one embodiment, setting context on the nearby device will also set the same context to all devices within the same room, same region, same wing, and/or the entire premises.

In one embodiment, the determined context is also based at least in part on other input data, for example temperature sensors, light level sensors, motion sensors, weather, time of day, and day of week. For example, when the temperature sensor senses a temperature colder than 68 degrees fahrenheit, the device may enter into a thermostat context, turn its display (426) a seafoam color, and configure its button (430) to incrementally increase the thermostat set point to warm up the room.

In one embodiment, the determined context is based at least in part on a highest audio level when a plurality of devices of FIG. 4A receive an audio input, such that the closest device is associated with the context. For example, a device in the kitchen, a device in the dining room, and device in a hallway may each hear the audio input "Josh, turn off the lights" but if the audio level is highest in the hallway, it may be determined that the appropriate context is to control the hallway lights, as it may be where the user is located.

The display (426) may be an array of more than one LEDs such as an LED ring. The array (426) may be configured such that brightness of the LEDs corresponds to a premises automation control level, for example a 50% brightness yellow LED ring may indicate a lighting level of 50%, and a 100% brightness yellow LED ring may indicate a maximum lighting level, or 'lights fully on'. The array (426) may be configured such that position, like a dial position or meter position, and/or animation of the LEDs corresponds to an automation control level, for example a yellow LED ring that is at a 50% position like a semicircle, or 50% on may indicate a lighting level of 50%, and a complete yellow LED ring like an "O" may indicate a maximum lighting level, or 'lights fully on'. An animation of LEDs may use frequency of pulses, angular velocity, or other motion to indicate an automation control level.

In one embodiment, the display (426) may include a feature for a timer to either flash, animate, and/or change color as the timer counts down. For example a 1-minute timer may flash green every second for the first 30 seconds, flash amber every second for the next 15 seconds, and flash red every half-second for the final 15 seconds.

In one embodiment, the toggle of a button (430) toggles between a state of "last active state" and "non-active state". For example, if a user has previously set the lights of a living room to be at 45% dimmed, retains a context of "lighting" (which may be indicated with a yellow LED (426)), and then taps the button (430), the lights may go off. If the button (430) remains in the context of "lighting" and the user taps the button (430) a second time, the lights may go back on with a state of 45% dimmed. This may be user configurable such that the toggle of a button (430) toggles between a state of "active state" and "non-active" state where when the user taps the button (430) a second time in the example above the lighting goes to 100% on. Similarly, for shades set by the user to 30 degrees, toggling a button (430) in the "shades" context may toggle between closed shades and 30 degrees.

In one embodiment, tapping button (430) repeatedly toggles the state of the device. Thus, an on/off device would toggle off when tapped, then on when tapped again, then off when tapped again, and so on, as long as the "context" of the button (430) and LEDs (426) remains the same, for example lights/yellow or shades/blue. In one embodiment, the cap of FIG. 4A has a timeout where after a threshold of time, for example 5 minutes, of no activity the LEDs (426) fade out and/or to a default color, and the button (430) goes back to its default state, for example lights/yellow.

In one embodiment, when multiple commands are given, such as "turn on the lights and turn on the TV," the button (430) and tap of button controls the last command given, in this example controls toggling the TV on or off. In one embodiment, a long tap, long hold, or tap-and-hold of button (430) cycles through a gradient. For example, if the current context of button (430) is lights and/or LEDs (426) are yellow and/or the last command was to "brighten the lights", then a long tap may ramp lights progressively brighter until a maximum brightness is reached. For example, if the current context of button (430) is speaker volume and/or LEDs (426) are pink and/or the last command was to "lower the volume", a long tap would progressively lower the volume until a minimum volume/mute were reached.

In one embodiment, a double tap is a device preset, for example with a last command to "turn on the lights", a double tap may set the light (426) brightness to a predefined value such as 75% brightness. For example, with a last command to "play some music", a double tap may skip a track, or set the volume to a predefined level, such as 30%. For example, with a last command to "make the lights warmer" a long tap may ramp the light color temperature/warmth up to a maximum level, and a double tap may reset the light color temperature/warmth to the current natural light value.

In one embodiment, the button (430) is further enhanced using the slider/switch (422). For example, a device reset may be a "tap plus slider" or "tap plus switch" to toggle the slider/switch (422) in a position while long holding the button (430). In one embodiment, the button (430) may include fingerprint detection for contexts such as 'security' so that an identification may be made of the user or a security comparison be made against the user's voice. In one embodiment, the button (430) may establish a link or hangup on an intercom between one device (206a) and a second device (206c) in the same premises, or it may establish a link or hangup to a phone link/phone user.

In one embodiment, the button (430) may control a second device of FIG. 4A. For example, if the audio input is a voice command of "Josh, we need our privacy" in a great room, the visual display device (426) may turn red to indicate a 'privacy' context, and turn off the microphone (424) input, and tapping the button (430) may mute or invoke a virtual privacy switch for all other devices in the same great room, including by turning their respective rings (426) red and turning off their microphone (424) input.

Context of control for the contextual premises automation button (430) include:
on/off devices light lights, TVs, fireplaces, and switches;
open/close devices including garage doors, gates, and shades;
establish communications/hangup for intercom between devices (206) and/or phone link services;
play/pause content including music and video; and/or
smart faucet or shower starting/stopping, similar to on/off.

Without limitation, examples of context and associated color include:
Privacy and/or Mute (red)
Lights (yellow)
Security (orange)
Fireplaces (crimson)
Fans (periwinkle)
Switches, garages, keypads (slate)
Thermostats (seafoam)
Sensors (amethyst)
Music (pink)
Shades (blue)
Sprinklers (leaf)
Intercom between devices (white)

In one embodiment, audio feedback cues the current context for button (430). For example, a quick triple tap may have the external speaker (215) describe the current context to say "Currently this device controls lighting."

In one embodiment, a contextual button (430) may be configurable to the following controls when the context is 'music' and/or the LED (426) is pink:
Single tap—toggle between turning off music and on music at a previous volume
Double tap—skip current playing track
Long hold—ramp up volume In one embodiment, tapping repeats certain commands. For instance, if a user asks for the score to a live sports game, election count, or the current time, tapping again may give the user an update on the requested information. For example, a user asks "what's the score of the Giant's game?" and gets a response back. Tapping the device a few minutes later may execute the same command to give an update on the current score.

In one embodiment, using the current state changes what the button (430) does. For instance, in a room with lights and music, if only one of those devices were on, a tap on button (430) could turn off that device by default without a command being given. In one embodiment, a single tap of button (430) runs a multi-device scene, such as turning an entire room on or off by toggling the lights, music, thermostat, fireplace, TV, fan, and shades together.

In one embodiment, a tap of button (430) triggers an audible action at one or more speakers (215) in addition to the LEDs (426) turning on. For example, if a user first issued a command to "turn on the lights", then a minute later tapped the button (430), the lights may go off and an audible response generated saying "your lights are now off." Tapping button (430) may toggle the lights on and give an audible response of "your lights are now on."

In one embodiment, the microphones (424) may be disabled both in software using button (430) or using the physical switch (422). If disabled with software (430), the LEDs (426) may light up red to indicate the microphones are disabled. In this state, a single tap on the button (430) may re-enable the microphones and/or turn off the red LEDs (426), rather than process the default single tap action. Tapping again may initiate the default tap now that the device is in normal operating mode.

In one embodiment, if the microphones (424) are disabled using the physical switch (422), tapping works as normal, where a single tap in this mode may still trigger the default tap state. LEDs (426) may not show red in this mode. If the microphones are disabled in software and the physical switch (422) is a toggle type switch, toggling the physical switch (422) may re-enable the microphones. If the switch is a slider (422), sliding down to the "disable" mode will turn off the software disable but override with the physical microphone (424) disconnect, and sliding back up will resume normal operating mode with microphones reconnected.

Figure 4B:
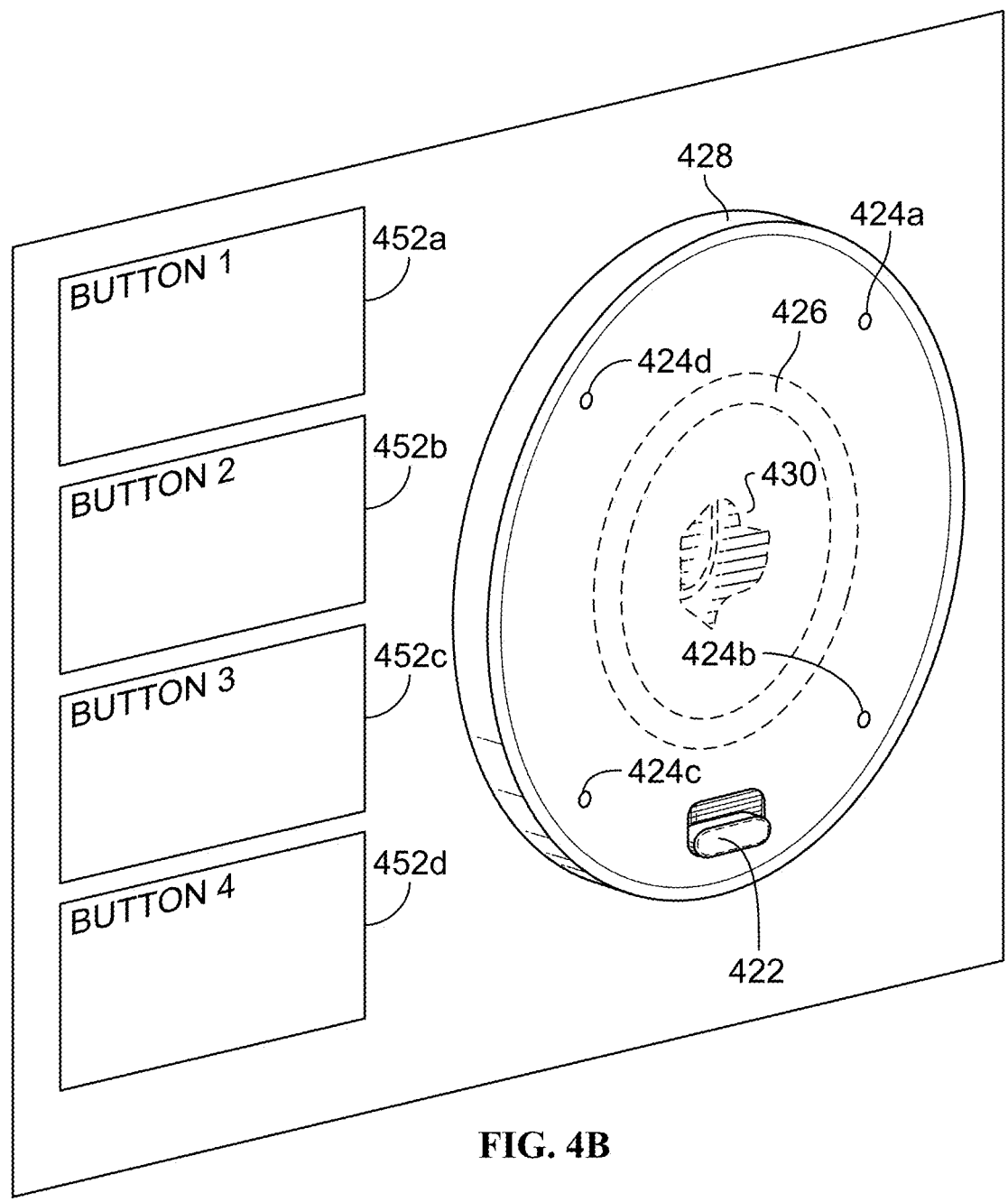
FIG. 4B is an illustration of an multi-key embodiment for an architectural audio/microphone cap.

FIG. 4B is an illustration of an multi-key embodiment for an architectural audio/microphone cap. In one embodiment, the device of FIG. 4A is inset into a wall plate with additional buttons (452). In the example shown in FIG. 4B, four additional buttons are shown, which may be assigned to a predefined function. One predefined function may be scenes, such that button (452a) is for an "all on scene", (452b) is for a "morning scene", (452c) is for an "evening scene", and (452d) is for an "all off scene". Buttons (452) may also interact with context and/or button (430). For example, button (452a) may set a 'lighting' context, button (452b) may set a 'shades' context, button (452c) may set a 'music' context, and button (452d) may set a 'privacy' context for button (430).

Figure 5:
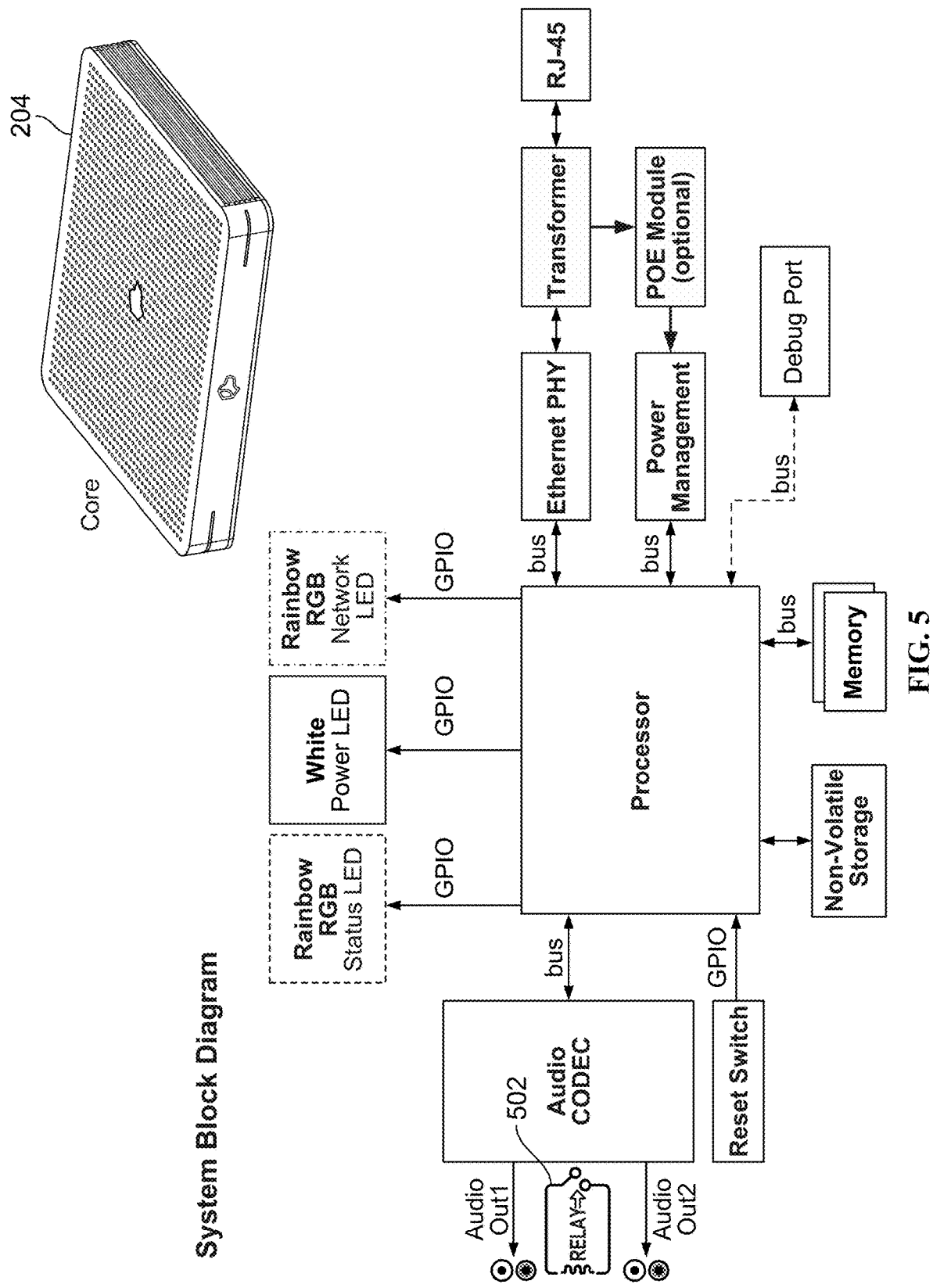
FIG. 5 is a block diagram illustrating an embodiment of a system for a premises automation core.

FIG. 5 is a block diagram illustrating an embodiment of a system for a premises automation core. In one embodiment, the block diagram of FIG. 5 is of the premises automation core (204) of FIG. 2A. The core (204) comprises at least one of the following: an RJ-45 connector, a transformer, an Ethernet PHY, an optional POE module, a power management subsystem, a processor, a status LED, a power LED, a network LED, memory, non-volatile storage, a debug port, a reset switch, and/or audio codec. The audio codec includes a physical relay (502).

Figure 6:
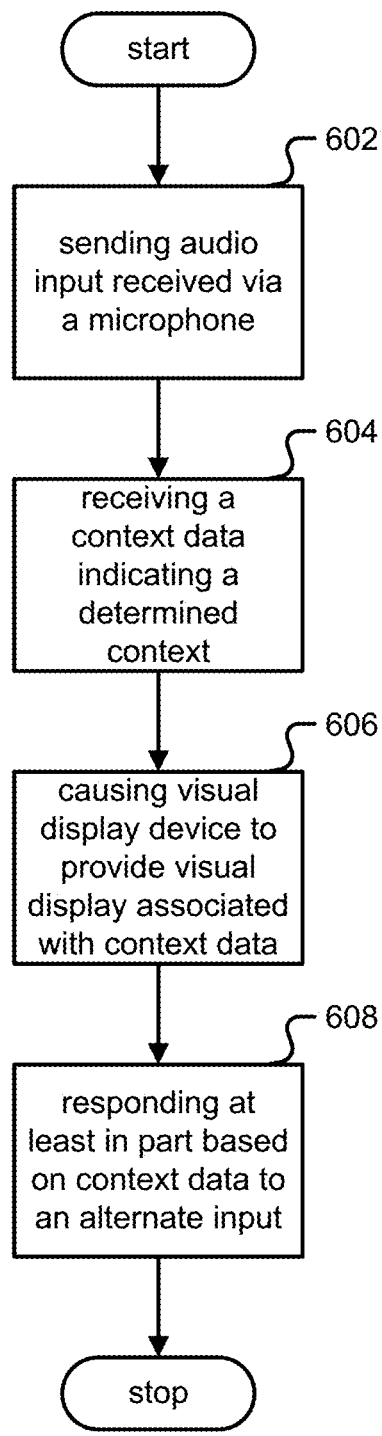
FIG. 6 is a flow diagram illustrating an embodiment of a process for processing a contextual premises automation button.

FIG. 6 is a flow diagram illustrating an embodiment of a process for processing a contextual premises automation button. In one embodiment, the system of FIG. 2B (206a-i), (206a-ii) and/or FIG. 4A carries out the process of FIG. 6.

In step (602), audio input received via a microphone is sent, for example to a premises automation core (204) in FIG. 2B. The microphone may be the microphone (424) in FIG. 4A, for example a microphone array (424a), (424b), (424c), (424d). In one embodiment, the premises automation control core (204) is configured to determine, based at least in part on the audio input, a premises automation context. An example of audio input may be 'Josh, what is the lighting level in this room?'

In step (604), a context data indicating a determined context is received, for example from a premises automation core (204). For example, the premises automation context may be 'privacy', 'mute', 'lights', 'security', 'fireplace', 'fans', 'switches', 'garage', 'keypad', 'thermostat', 'sensor', 'music', 'shades', and/or 'sprinkler'. For an audio input of 'Josh, what is the lighting level in this room?', the determined context may be 'lights in the current room', and the context data may be associated with 'dining room lighting' if the device of FIG. 4A is in the dining room.

In step (606), a visual display device is caused to provide a visual display associated with the context data. In one embodiment, the visual display device is an LED ring. For example, for a context data associated with 'dining room lighting', the visual display device associated with the dining room device may turn yellow with a brightness associated with the current dimness level of the dining room lights.

In step (608), a response is made at least in part based on the context data to an alternate input made via a physical input device while the visual display device is providing the visual display associated with the context data. The response may be made by the device of FIG. 4A and/or the premises automation core (204) of FIG. 2B. The physical input device may be a button having at most two states, for example a capacitive touch surface. For example if an alternate input is a single tap of the button, and the context data is associated with 'dining room lighting', the response may be to toggle the lighting of the dining room between 'off' and 'on at current dimness level'.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A device, comprising:
 a microphone;
 a communication interface configured to send to a premises automation control core audio input received via the microphone;
 wherein the premises automation control core is configured to determine, based at least in part on the audio input, a premises automation context associated with the device and send to the device via the communication interface a control context data indicating the determined premises automation context;
 wherein the premises automation context comprises; a location context associated with a physical room; and a control system controlling an aspect of the physical room or premises;
 a visual display device;
 a physical input button device; and a processor coupled to the visual display device and the communication interface, wherein the processor is configured to;
receive the control context data;
select a control system indicator color based at least in part on the control system of the determined premises automation context;
select a control system indicator brightness based at least in part on an automation control level of the control system of the determined premises automation context; and
cause the visual display device to provide a visual display with the control system indicator color and the control system indicator brightness;
configure a contextual meaning for the physical input button device based at least in part on the control system of the determined premises automation context;
and
wherein at least one of the processor and the premises automation control core is configured to control the control system in a manner determined at least in part based on the contextual meaning for the physical input button device.

2. The device of claim 1, wherein the visual display device includes an LED.

3. The device of claim 1, wherein the visual display device is associated with the context data.

4. The device of claim 1, wherein the visual display device is associated with the context data and includes a color associated with the context data.

5. The device of claim 1, wherein the visual display device is associated with the context data and includes a position associated with the context data.

6. The device of claim 1, wherein the visual display device is associated with the context data and includes an animation associated with the context data.

7. The device of claim 1, wherein the visual display device is a ring of LEDs.

8. The device of claim 1, wherein the visual display device is a ring of LEDs, with a brightness associated with a premises automation control level being controlled.

9. The device of claim 1, wherein the visual display device is a ring of LEDs, with a position associated with a premises automation control level being controlled.

10. The device of claim 1, wherein the physical input device comprises a button.

11. The device of claim 1, wherein the physical input device comprises a button comprising a capacitive touch surface.

12. The device of claim 1, wherein the physical input device comprises a physical switch.

13. The device of claim 1, wherein the alternate input comprises at least one of the following: a single tap; a double tap; a toggle; a long hold; a tap plus switch; and a tap plus slider.

14. The device of claim 1, wherein determining the premises automation context comprises determining an intent from a natural language utterance.

15. The device of claim 1, wherein the audio input comprises at least one of the following: a voice command; a voice command that the premises automation core determines the premises automation context; an explicit voice command that names the premises automation context; and a sound in a room associated with the device.

16. The device of claim 1, wherein the control of the control system in the manner determined at least in part based on the context data to the alternate input made via the physical input device comprises control of a second device.

17. The device of claim 16, wherein the second device is in a same room as the device.

18. The device of claim 1, wherein the control of the control system in the manner determined at least in part based on the context data to the alternate input made via the physical input device comprises music played via an external speaker, wherein the external speaker is not comprising the device.

19. The device of claim 1, wherein the determined context is also based at least in part on other input data comprising at least one of: temperature sensors, light level sensors, motion sensors, weather, time of day, and day of week.

20. The device of claim 1, wherein the device is one of a plurality of devices to receive audio input and only a nearby visual display device of a nearby device in the plurality of devices with a highest audio level associated with its audio input is provided an associated visual display.

21. The device of claim 1, wherein the premises automation context further comprises association of a specific user.

22. The device of claim 1, wherein the control system comprises at least one of the following: lighting, television, fireplaces, switches, garage doors, gates, music, shades, intercom, faucets, showers, security, fans, thermostats, and sprinklers.

23. A method, comprising:
sending to a premises automation control core audio input received via a microphone;
wherein the premises automation control core is configured to determine, based at least in part on the audio input, a premises automation context;
wherein the premises automation context comprises; a location context associated with a physical room; and a control system controlling an aspect of the physical room or premises;
receiving a control context data indicating the determined premises automation context;
selecting a control system indicator color based at least in part on the control system of the determined premises automation context;
selecting a control system indicator brightness based at least in part on an automation control level of the control system of the determined premises automation context;
causing a visual display device to provide a visual display with the control system indicator color and the control system indicator brightness;
configure a contextual meaning for a physical input button device based at least in part on the control system of the determined premises automation context; and
controlling the control system in a manner determined at least in part based on the contextual meaning for the physical input button device.

24. A computer program product embodied in a non-transitory computer readable medium and comprising computer instructions for:
sending to a premises automation control core audio input received via a microphone;
wherein the premises automation control core is configured to determine, based at least in part on the audio input, a premises automation context;
wherein the premises automation context comprises; a location context associated with a physical room; and a control system controlling an aspect of the physical room or premises;

receiving a control context data indicating the determined premises automation context;

selecting a control system indicator color based at least in part on the control system of the determined premises automation context;

selecting a control system indicator brightness based at least in part on an automation control level of the control system of the determined premises automation context;

causing a visual display device to provide a visual display with the control system indicator color and the control system indicator brightness;

configure a contextual meaning for a physical input button device based at least in part on the control system of the determined premises automation context; and controlling the control system in a manner determined at least in part based on the contextual meaning for the physical input button device.

* * * * *